March 16, 1954     H. BUCHANAN     2,672,363
BUMPER WITH HINGED SECTION
Filed Jan. 29, 1949     2 Sheets-Sheet 1
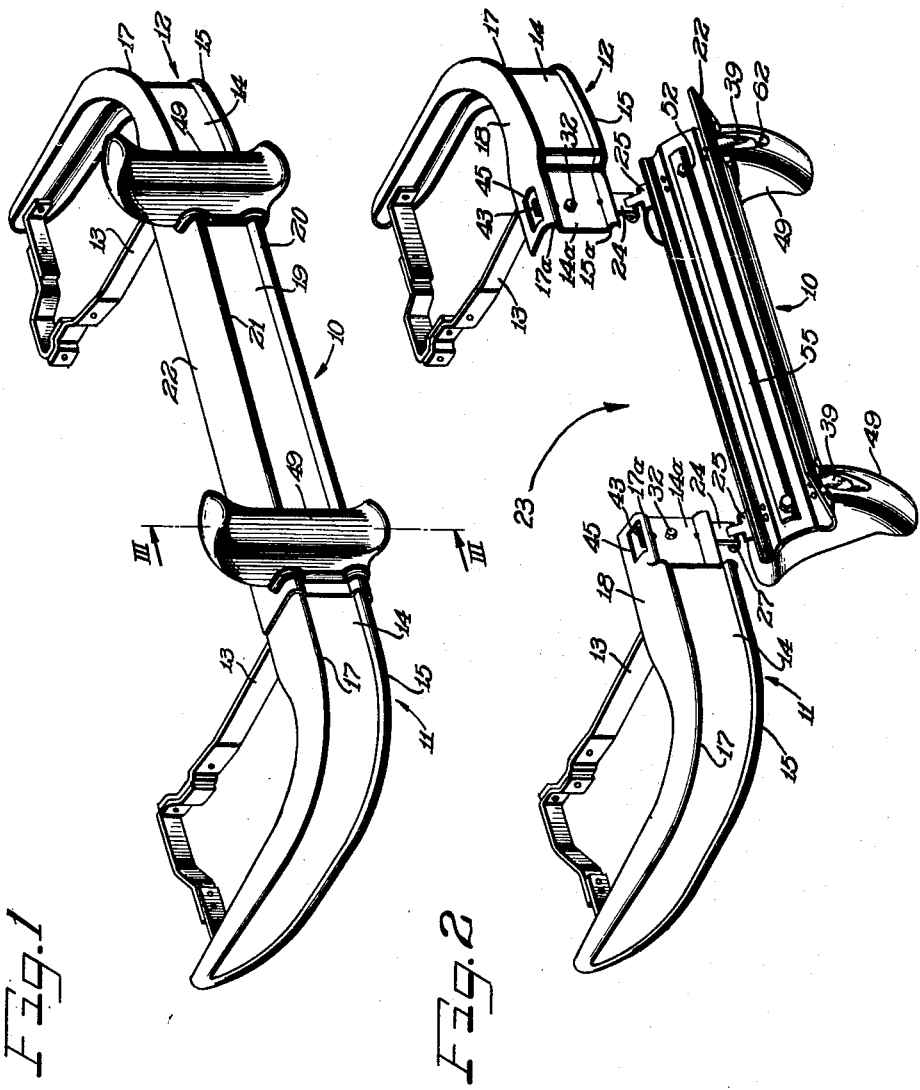
Inventor
Hugh Buchanan March 16, 1954
H. BUCHANAN
2,672,363
BUMPER WITH HINGED SECTION
Filed Jan. 29, 1949
2 Sheets-Sheet 2
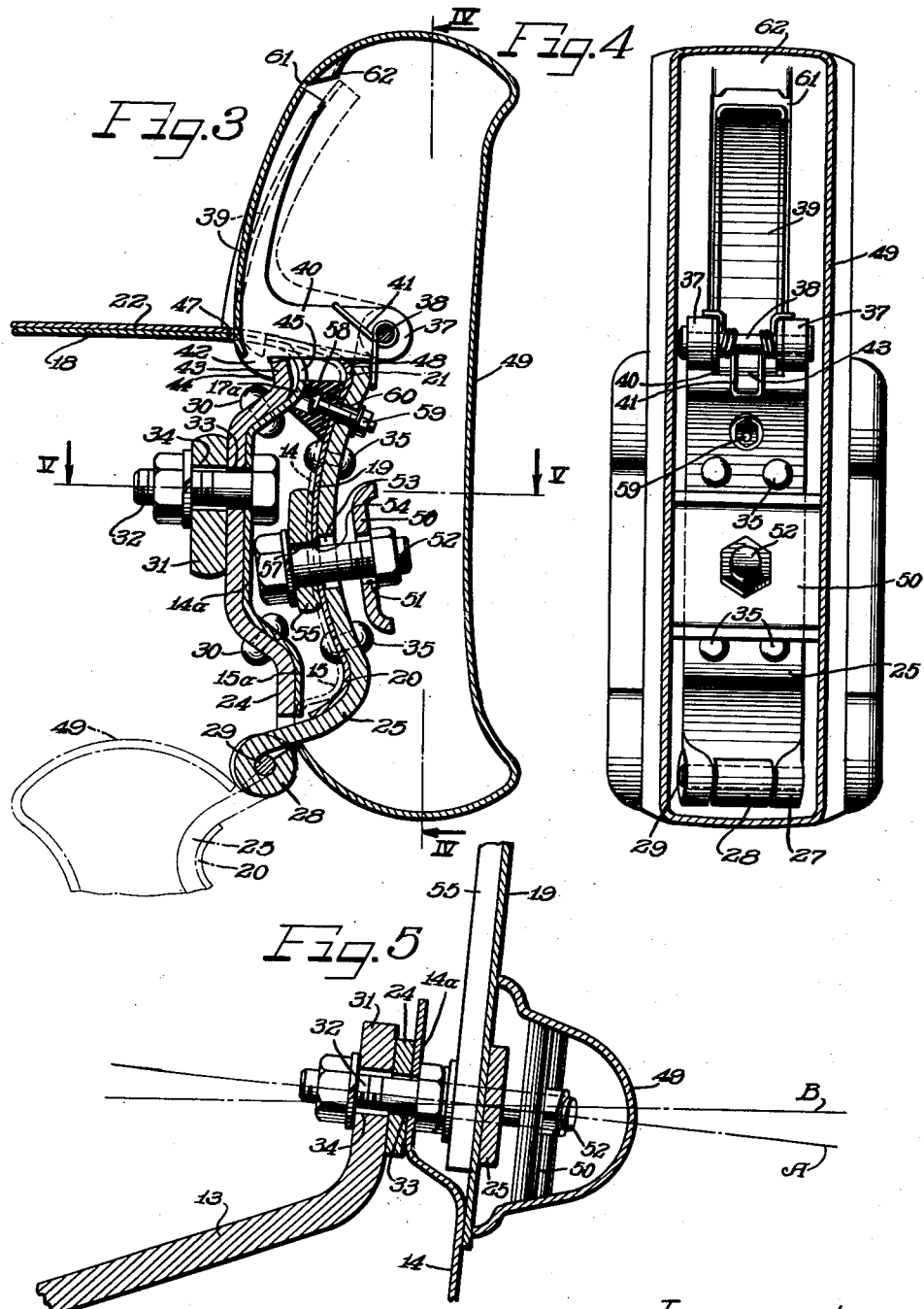
Inventor
Hugh Buchanan
By Attys Patented Mar. 16, 1954

2,672,363

UNITED STATES PATENT OFFICE 2,672,363

BUMPER WITH HINGED SECTION

Hugh Buchanan, Detroit, Mich., assignor to Houdaille-Hershey Corporation, Detroit, Mich., a corporation of Michigan Application January 29, 1949, Serial No. 73,573

20 Claims. (Cl. 293—73)

1

The present invention relates to improvements in bumpers for automotive vehicles or the like and is especially concerned with front or rear bumpers through which a substantial access opening must be provided.

An important object of the present invention is to provide an improved bumper for vehicles or the like and having an access opening therethrough normally closed by a hinged section that can be swung clear of the opening.

Another object of the invention is to provide in a bumper construction an improved multi-section structure which in full assembly affords the appearance of a substantially continuous bumper unit.

A further object of the invention is to provide a bumper which is adapted to be used adjacent to the normal deck floor of an automobile at such an elevation as to clear an opening to a storage compartment and a spare wheel or tire is disposed in such a position that it cannot be tilted upwardly in order to clear a normal one piece bumper bar, the bumper bar of the present invention affording freedom of access to the spare wheel or tire by movement of a portion of the bumper bar clear of an appropriate access opening therein.

Still another object of the invention is to provide improved means in a sectional bumper bar for maintaining the sections in separable assembly.

Other objects, features and advantages of the present invention will be readily apparent from the following detailed description of a preferred embodiment thereof taken in conjunction with the accompanying drawings in which:

Figure 1 is a perspective view of a bumper bar embodying the features of the present invention;

Figure 2 is a perspective view of the same bumper bar with a central hinged section thereof swung down to afford an access opening through the bumper bar;

Figure 3 is an enlarged vertical sectional view taken substantially on the line III—III of Figure 1;

Figure 4 is a sectional elevational view taken substantially on the line IV—IV of Figure 3; and Figure 5 is a fragmentary horizontal sectional view taken substantially on the line V—V of Figure 3.

The bumper construction chosen for illustration herein is of the kind adapted to be used adjacent to the storage compartment of an automobile which according to current conventional practice is located at the rear of the automobile.

2

It will be apparent that if such storage compartment is located at the front of the automobile a bumper embodying the principles of the present invention may be used at that location as well or alternatively. Where a spare wheel or tire is supported below the deck or floor of the storage compartment, the present bumper is especially useful since it is provided with means providing selective clearance to gain access to the spare wheel or tire at will, at other times presenting a continuous bumper across the end of the automobile. To this end, the bumper comprises a central portion or section 10 and similar though reversely formed opposite side portions or sections 11 and 12. The respective end sections of the bumper are equipped with attachment bracket bar structures 13 by which the bumper is attached to the vehicle. As shown, the bumper is of the relatively massive shell type suitably shaped from appropriate gauge sheet metal with each of the end sections comprising a generally vertical body portion 14 formed with outwardly projection lower and upper generally horizontal reinforcing ribs 16 and 17, the upper rib merging with a generally horizontal reinforcing and finishing flange 18.

As best seen in Figure 1 the central section 10 is so constructed and arranged that when it is in full operative assembly with the end sections 11 and 12 a body portion 19 overlaps at its ends with the body portions 14 of the end sections while complementary lower and upper ribs 20 and 21 match and overlap with respect to the lower and upper ribs 16 and 17 of the end sections and an upper inwardly extending flange 22 overlaps the adjacent ends of the end section flanges 18. Thereby an attractive, finished, ornamental and sturdy bumper is provided which presents a complete buffer for the adjacent end of the vehicle and appears as a substantially continuous bumper.

Means are provided for separably hinging the central section 10 of the bumper assembly to the side sections 11 and 12 for downward swinging movement or displacement in order to clear an access space or gap 23 between the adjacent inner ends of the side sections (Figure 2). To this end, each of the side sections carries a hinge bracket plate 24 adjacent to its inner end and having a portion extending downwardly below the lower edge of the carrying section for hinged engagement with a complementary downwardly extending portion of a respective bracket plate 25 carried adjacent to the end portion of the central bumper section 10. Spaced, coaxial integral rearwardly turned hinge curls 27 are formed on the lower end of each of the hinge bracket plates 24. Coaxially between the hinge curls 27 is received a lower extremity hinge curl 28 on the cooperating hinge bracket plate 25, and a hinge pin 29 pivotally connects the hinge curls for operation. Thus, the central bumper section 10 is adapted to be swung at will into and out of closing or bridging relation to the access gap 23 at will, such gap being of any preferred length such, for example, as will permit passage of a spare wheel or tire in a generally horizontal plane.

Additional functions besides merely hinging connection are in the present instance assigned to the hinge bracket plates 24 and 25. One of these functions is that of serving as respective reinforcing bars. Another function is that of serving as respective attachment or supporting elements or members. A further function is that of serving as part of a latching mechanism for securing the bumper sections in their full bumper relationship.

Having reference to Figures 3, 4 and 5, each of the hinge bracket plates 24 is in the form of a generally vertically elongated bar conformed, complementary to the cross-sectional shape of the end bumper section by which carried and secured to the inner face of such section in snug nested relation by suitable attaching means such as rivets 30. The upper extremity of the hinge member 24 extends relatively closely under the upper inturned flange 18 of the bumper bar end section. Through this arrangement the hinge member 24 serves as a vertical reinforcing bar for its bumper section.

In view of the relative rigidity of the hinge plate and reinforcing bar 24 as compared to the end bumper section by which carried, attachment of the mounting bracket 13 to the bumper section, at least in part, is effected by securing a terminal flange 31 on the adjacent end of the mounting bracket to the inner face of the bar 24 by means such as a bolt 32, the shank of which extends through registering bolt apertures 33 in the reinforcing bar and overlapping portion of the bumper section and an aperture 34 in the flange 31. Attachment by means of the bolt 32 enables separation of the bumper end section from the mounting bracket 13.

Similarly, the hinge plate 25 in each instance provides a vertical reinforcing bar for the body portion 19 and the ribs 20 and 21 of the central section of the bumper, being for this purpose conformed to the cross-sectional shape of the outer face of the bumper and snugly secured in face-to-face relation thereto as by means of rivets 35.

As stated hereinbefore, the associated hinge and reinforcing plates or bars 24 and 25 also serve as components of a latching mechanism. To this end the upper end portion of the bar 25 in each instance extends above the upper marginal inturned flange 22 of the central bumper section and is formed with a pair of spaced coaxial journal curls or bearings 37 with which is assembled a pivot or bearing pin or shaft 38 affording a pivot for a generally L-shaped latch member 39. The lower generally horizontal leg portion of the latch member 39, identified at 40 comprising a pair of parallel leg portions is pivotally assembled with the shaft 38 for rocking movement between substantially the full line and dash line positions of Figure 3. A hairpin type torsion spring 41 is carried by the shaft 38 and has portions thereof engaging against the outer face of the upper portion of the bar 25 and against the upper edges of the latch legs 40 under preloaded torsion normally to urge the latch member 39 downwardly and inwardly. At the heel portion of the latch member 39 downwardly extending latching detent lugs or spurs 42 are disposed to engage behind the upper extremity of the hinge and reinforcing bar 24 which is formed with a latching head or shoulder extremity portion 43 providing keeper means for latching engagement with the spurs 42. Thus, in the assembled condition of the central bumper section 10 with the side sections 14 and 15 the latch members 39 connect the upper ends of the hinge and reinforcing bars 24 and 25 together and hold the central bumper section 10 against displacement. To release the latches 39, they are rocked forwardly manually in opposition to the bias of the springs 41, as by pressing a finger against the inner faces of the upstanding portions of the latch members until the latching spurs 42 clear the latching heads 43, as shown in dash outline in Figure 3, and the central bumper section 10 will then swing forwardly and downwardly about the hinge axis defined by the hinge pins 29. To return the central bumper section 10 to assembled condition with the side sections of the bumper all that need be done is to swing the central section up until cam edges 44 on the latching spurs ride over the respective latch heads 43 and the spurs snap down behind the latch heads under the spring bias of the springs 41.

To afford clearance for the latching members 39, an aperture 45 is provided in the outer margin of the upper bumper flange 18 in each instance, and a matching aperture 47 is provided in the overlapping portion of the bumper flange 22. A stop against overrocking of the latch member 39 under the bias of the spring 41 in the unlatched condition of the mechanism is afforded by a shoulder 48 provided by the outer edge defining the clearance aperture 47 and is engageable by the latch member legs 40.

In order to provide an ornamental and protective closure for the latch mechanism as well as the hinge and reinforcing bar 25, in each instance, respective bumper guards 49 are mounted on the central bumper section 10. For this purpose the bumper guards 49 are formed as sheet metal shells having the side walls thereof extending toward the intermediate bumper section 10 and formed complementary thereto to engage snugly against the outer face of the central bumper section. Each of the bumper guards 49 has a transverse attachment bar 50 rigidly secured between the side walls thereof and formed with an aperture 51 by which an attachment bolt 52 is accommodated for securing the bumper bar in place. Herein such attachment is effected at the point of reinforcement of the central bumper section 10 by the reinforcing bars 25 which for this purpose are formed with bolt clearance holes 53 registering with respect to bolt clearance apertures 54 in the contiguous portion of the body 19 of the bumper section.

Further reinforcement of the central bumper section 10 is attained by securing a longitudinally extending reinforcing bar 55 to the inner side of the body portion 19 thereof and adapted to be secured in place by the bolts 52. For this purpose the reinforcing bar has appropriate bolt holes 57 registering with the bolt holes 53 and 54. Thus, not only does the reinforcing bar 55 reinforce the central bumper section 10 at the points of engagement by the bolts 52 in securing the bumper guards 49 in place, but the portion of the central bumper section intermediate the bumper guards is also reinforced for more adequately withstanding impacts thereagainst.

In order to accommodate the heads of the bumper guard attachment bolts 52, as well as the heads of the mounting bracket attachment bolts 32, within the space between the overlapping ends of the bumper sections, the end portions of the side bumper sections 11 and 12 where they are overlapped and concealed by the end portions of the central bumper section 10, are preferably inset as best seen in Figure 2 and also indicated in Figures 3 and 5. The extent of inset is indicated in Figure 3 by the dash outline which shows the normal projection of the end bumper section while the full line section shows the inset. The inset portion of the body of the side bumper section is identified at 14a, and the lower and upper ribs are identified as respectively 15a and 17a.

Assurance of a rattle-free relationship between the central bumper section and the side sections is assured by the provision of resilient cushioning and take-up means which may be in the form of a rubber or rubber-like cushioning block or boss 58 which may be secured to the inner face of the bumper body 19 as by means of an attachment bolt 59 passing through registering bolt apertures 60 in the bumper body portion 19 and the reinforcing bar 25. The location of the cushioning member 58 is preferably adjacent the top of the bumper and centered immediately below the latch member 39 where the cushioning member will serve to take up any slack that may be present between the latching spurs 42 and the latch head 43.

Access to the manipulating leg of the latch member 39 is afforded at the inner side of the bumper guard 49 in each instance through an opening 61 in the inner wall of the upstanding portion of the bumper guard. By preference the shape of the exposed upper portion of latch 39 is generally complementary to the wall of the upper inner portion of the bumper guard so as to afford a generally finished appearance. A slight finger clearance inset 62 may be provided at the upper margin defining the latch aperture 61.

In order to accommodate the mounting structure for the central bumper section 10 to a certain amount of sweepback of the bumper it may, as shown, be desirable to have the hinges disposed on a common axis which is angular to the vertical median plane through the remainder of the associated apparatus and which plane is represented by the line A in Figure 5, while the line B represents a vertical plane perpendicular to the hinge axis. This relationship is also apparent in Figure 4 and to a lesser extent in Figure 3.

By having the hinge axis as represented by the hinge pins 29 offset inwardly from the center of gravity of the central bumper section 10, assurance will be had that not only will the central section 10 easily swing down virtually of its own weight when the latches 39 are released, but also that in the fully released position of the central section 10 it will hang substantially inwardly of the bumper assembly and thus avoid interference with reasonably close approach to the bumper line when it is necessary to utilize the access opening 23 in the bumper. The dot dash position indicated in Figure 3 represents substantially the swung down position of the central bumper section.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a sectional bumper construction, separate side sections spaced apart to afford a gap therebetween, a central section bridging said side sections and cooperating therewith to provide, in effect, a complete and continuous bumper, all of said sections having generally vertical portions and an inturned upper flange portion, the vertical and upper flange portions of the side sections and the central section being separably disposed in generally complementary relation, and means comprising vertical reinforcing bars pivotally connecting the central and side sections adjacent the lower margins thereof for downward swinging movement of the central section to hang down clear of the gap separating the side sections.

2. In combination in a sectional bumper construction, separate spaced apart side sections, a central section closing the gap between said side sections to provide, in effect, a complete and continuous bumper, means for separably securing the central section in place with regard to the side sections and for reinforcing said sections, said securing means providing for downward swing movement of the central section through substantially 180° to hang down clear below the gap separating the side sections, and bumper guard means carried by the central section and concealing said securing means.

3. In combination in a sectional bumper guard construction, separate side sections spaced apart to afford an access opening gap therebetween, a central section closing said gap, all of said sections being formed from sheet metal and having in each instance a body portion and upper and lower reinforcing integral ribs at the margins of the body portions, the ends of the central section overlapping the adjacent inner end portions of the side sections and interfitting therewith in complementary fashion to afford the appearance of a substantially continuous bumper, the inner end portions of the side sections overlapped by the end portions of the central section being inset to afford a space between the inside of the central section and the inset areas, and means separably connecting the central and side sections and adapted for movement of the central section relative to the side sections to open said gap by downward swinging movement of the central section to hang clear below said gap, said means being in part accommodated within said space between the central section and said inset areas.

4. In combination in a sectional bumper guard construction, separate side sections spaced apart to afford an access opening gap therebetween, a central section closing said gap, all of said sections being formed from sheet metal and having in each instance a body portion and upper and lower reinforcing integral ribs at the margins of the body portions, the ends of the central section overlapping the adjacent inner end portions of the side sections and interfitting therewith in complementary fashion to afford the appearance of a substantially continuous bumper, means comprising reinforcing bars connecting the central and side sections and adapted for movement of the central section relative to the side sections to open said gap by downward swinging movement of the central section through substantially 180°, and bumper guards mounted at the respective opposite end portions of the central section and moveable therewith.

5. In combination in a sectional bumper construction, separate side sections spaced apart to afford an access opening gap therebetween, a central section overlapping the adjacent end portions of the side sections and interfitting therewith to afford the appearance of a substantially continuous bumper, the inner end extremities of the side sections overlapped by the end portions of the central section being inset to afford space between the inside of the central section and the inset areas, and means for detachably connecting the central section to the sides sections and in part accommodated within said clearance spacings afforded by said inset areas, said connecting means providing for downward swinging movement of the central section through substantially 180° to clear the gap separating the side sections.

6. In combination in a sectional bumper construction, side bumper sections spaced apart to afford an access opening gap therebetween, a central bumper section closing said gap and cooperating with said side sections to provide, in effect, a complete and continuous bumper, said central section being hingedly attached to said side sections to swing about a horizontal axis into and out of closing relation to said gap to hang clear below said gap, releasable latching mechanism carried in part by and reinforcing the central section and in part by the side sections, and bumper guard means attached to the central section and substantially concealing said latching means said bumper guard means providing convenient handles for manipulating said central section.

7. In combination in a sectional bumper construction, side bumper sections spaced apart and affording an access opening gap therebetween, a central section closing said gap and cooperating with said side sections to provide, in effect, a complete and continuous bumper, and means hingedly connecting said central section to said side sections for downward swinging movement through substantially 180° into and out of gap closing relation to the side sections, said hinge means including a reinforcing bar and hinge plate secured to the inner end portion of each of the side sections and a reinforcing bar and hinge plate secured to each of the respective end portions of the central section, said reinforcing bars and hinge plates having extremity portions projecting beyond the adjacent margins of the bumper sections and pivotally connected on a common axis.

8. In combination in a sectional bumper construction, side bumper sections spaced apart and affording an access opening gap therebetween, a central section closing said gap and cooperating with said side sections to provide, in effect, a complete and continuous bumper, and means hingedly connecting said central section to said side sections for downward swinging movement through substantially 180° into and out of gap closing relation to the side sections, said hinge means including a reinforcing bar and hinge plate secured to the inner end portion of each of the side sections and a reinforcing bar and hinge plate secured to each of the respective end portions of the central section, said reinforcing bars and hinge plates having extremity portions projecting beyond the adjacent margins of the bumper sections and pivotally connected on a common axis, the opposite ends of the reinforcing bars and hinge plates having releasable latch mechanism interconnecting the same.

9. In combination in a sectional bumper construction, opposite side sections spaced apart to provide an access opening gap therebetween, a central bumper section closing said gap and cooperating with said side section to provide, in effect, a complete and continuous bumper, a separate combination hinge, reinforcing and latch bar extending vertically on each respective opposite end portion of the central section, a separate vertically extending combination hinge, reinforcing and latch bar carried by the respective inner end portion of each of the side sections, certain ends of the central section carried bars and the corresponding side section carried bars being pivotally connected for substantially 180° downward hinged movement of the central section into and out of gap-closing relation to the side sections of the bumper, and separable latching means connecting the remaining ends of the bars in the gap-closing position of the central section.

10. In combination in a sectional bumper construction, opposite side sections spaced apart to provide an access opening gap therebetween, a central bumper section closing said gap and cooperating with said side section to provide, in effect, a complete and continuous bumper, a separate combination hinge, reinforcing and latch bar extending vertically on each respective opposite end portion of the central section, a separate vertically extending combination hinge, reinforcing and latch bar carried by the respective inner end portion of each of the side sections, certain ends of the central section carried bars and the corresponding side section carried bars being pivotally connected for substantially 180° downward hinged movement of the central section into and out of gap-closing relation to the side sections of the bumper, and separable latching means connecting the remaining ends of the bars in the gap-closing position of the central section, said latching means comprising a latch member pivotally supported by the central section carried bars and having latching spur means thereon engageable latchingly with the end portions of the respective side bumper section carried bars.

11. In combination in a sectional bumper construction including side bumper sections and a central bumper section cooperative with the side bumper sections to close an access opening gap between the side bumper sections and interfitting therewith to afford the appearance of a substantially continuous bumper, said central bumper section being formed from relatively thin sheet metal, and a reinforcing bar secured longitudinally to the inner side of said central bumper section, and hinging means connecting said central section with said side section to provide for substantially 180° downward swinging of the central section to open said gap.

12. In combination in a sectional bumper construction, side bumper sections, a separable central bumper section operative to close an access opening gap between the side bumper sections to provide, in effect, a complete and continuous bumper, means separably connecting the central bumper section to the side bumper sections to provide for substantially 180° downward swinging of said central section to open said gap, said central bumper section being formed from relatively thin sheet metal, and vertical and longitudinal reinforcing bars secured to said central bumper section.

13. In combination in a sectional bumper construction, a pair of side bumper sections spaced apart and affording an access opening gap therebetween, a central bumper section closing said gap and interfitting with said side section to afford the appearance of a substantially continuous bumper, vertical reinforcing bars secured to the respective adjacent end portions of the side sections and the central section, said bars being pivotally connected and affording a hinge by which the central section is adapted to be swung downwardly substantially 180° into and out of gap-closing relation, and mounting bracket structure secured to the reinforcing bars of the side bumper sections.

14. In combination in a sectional bumper construction of the character described, side bumper sections each formed from thin sheet metal including a generally vertical part and an upper generally horizontally extending marginal inturned flange, said side sections being spaced apart to afford an access opening gap therebetween, a central gap-closing bumper section generally complementary in shape to the side sections and cooperating with the outer faces of the side sections to close said gap to afford the appearance of a substantially continuous bumper, means hingedly connecting the adjacent end portions of the central section and the side sections adjacent the lower margins thereof, the upper flanges of the side sections having openings therein adjacent to the inner ends of the side sections, latch means carried by reinforcing the end portions of the central section, and cooperating latch means carried by and reinforcing the side sections and operatively cleared by said openings, said latch means on the central and on the end sections being cooperable to hold the central section in the gap-closing relation and being releasable to enable substantially 180° downward swinging of the central section out of the gap-closing position.

15. In combination in a sectional bumper construction, side bumper sections spaced apart to afford an access opening gap therebetween, a central bumper section closing said gap and cooperating with said side sections to provide, in effect, a complete and continuous bumper, said central section being hingedly attached to said side sections to swing about a horizontal axis into and out of closing relation to said gap to hang clear below said gap, releasable latching mechanism carried in part by the central section and carried in part by and reinforcing the side sections, and bumper guard means attached to the central section and substantially concealing said latching means, said bumper guard means providing a convenient handle for manipulating said central section.

16. In combination in a sectional bumper construction, separate side sections spaced apart to afford an access opening gap therebetween, a central section overlapping the adjacent end portions of the side sections, the inner end extremities of the side sections overlapped by the end portions of the central section being inset to afford space between the inside of the central section and the inset areas, and means for detachably connecting the central section to the side sections and in part accommodated within said clearance spacings afforded by said inset areas, said means including hinged structure projecting downwardly from said inset areas and having hinge axis inset relative to said inset areas, whereby said central section can be swung downwardly and inwardly relative to said side sections.

17. In a vehicle including a body structure, a bumper assembly mounted on said body structure including independent stationary sections and a shiftable section, said stationary sections comprising supports fixed to said body structure and extending rearwardly therefrom and comprising spaced bumper members mounted on said supports, one on each side of said vehicle and having adjacent end portions terminating in spaced relation, said shiftable section comprising bumper guard members pivotally mounted on said stationary sections and a center member connected between said guard members and movable therewith, said center member being substantially horizontally aligned with said bumper members to provide a continuous bumper structure across said vehicle.

18. In a vehicle including a body structure having supporting means extending outwardly therefrom, a bumper and bumper guard assembly comprising spaced side bumper members secured to said supporting means and disposed on opposite sides of said vehicle, the adjacent sides of said bumper members being disposed in a spaced relation, bumper guard members pivotally secured to said supporting means and disposed adjacent the adjacent ends of said side bumper members, said guard members being adapted to be pivoted away from said side bumper members, latch means secured to said guard members and engageable with keeper means on said side members for detachably securing said guard members to said side members in a vertical position, and a center member connected between said guard members and movable therewith, said center member being substantially aligned with said side bumper members to provide a continuous bumper structure across said vehicle.

19. In a sectional bumper construction, side bumper sections spaced apart to afford an access opening gap therebetween, a central bumper section cooperating with said side sections to close said gap and to provide, in effect, a complete and continuous bumper, pivot bracket members mounted adjacent the lower margins of the side bumper sections adjacent to said gap, pivot bracket members mounted in cooperation with the respective end portions of said central bumper section, said first mentioned pivot bracket members and said last mentioned pivot bracket members being pivotally connected together for swinging of the central bumper section about a horizontal axis downwardly to clear said gap, releasable means for securing said central bumper section in upright relation to said central bumper sections to afford said continuous bumper, and bumper guard means extending upwardly from said central bumper section and affording handle means for manipulation of the central bumper section and swinging the same into and out of closing relation to said gap when said securing means has been released.

20. In a sectional bumper construction, bracket structures for attachment to a vehicle body, said bracket structures being spaced apart, side bumper sections spaced apart to afford an access opening gap therebetween, means attaching said side bumper sections to said bracket structures, respectively, and including respective depending substantially rigid bar members, pivot bracket members pivotally connected to the lower end portions of said bar members, respective bumper guards and a transverse central bumper section attached to said pivot bracket members, said central bumper section being related to the side bumper sections to provide, in effect, a complete and continuous bumper, and means for releasably attaching said central bumper section and said bumper guards in upright relation relative to said side bumper sections and with the central bumper section closing said gap, said central bumper section and said bumper guards being swingable downwardly to clear said gap upon release of said securing means.

HUGH BUCHANAN.

References Cited in the file of this patent

UNITED STATES PATENTS

| Number | Name | Date |
|---|---|---|
| D. 134,453 | Cadwallader | Dec. 1, 1942 |
| 1,527,184 | Grotenhuis | Feb. 24, 1925 |
| 1,562,694 | Farum | Nov. 24, 1925 |
| 1,572,603 | Heide | Feb. 9, 1926 |
| 1,623,413 | Jandus | Apr. 5, 1927 |
| 1,977,734 | Monckmeier | Oct. 23, 1934 |
| 2,206,444 | Beckwith | July 2, 1940 |
| 2,215,002 | Jandus et al. | Sept. 17, 1940 |
| 2,273,131 | Monckmeier | Feb. 17, 1942 |
| 2,283,464 | Sandberg | May 19, 1942 |